United States Patent [19]
Frankhouse et al.

[11] Patent Number: 5,940,120
[45] Date of Patent: Aug. 17, 1999

[54] VANITY CONSOLE

[75] Inventors: Jay M. Frankhouse; Ryan S. Anair; Michael B. Vanden Elzen, all of Holland; Russell L. Clark, West Olive, all of Mich.

[73] Assignee: Prince Corporation, Holland, Mich.

[21] Appl. No.: 08/545,947

[22] Filed: Oct. 20, 1995

[51] Int. Cl.⁶ .................................................. H04N 7/18
[52] U.S. Cl. ............................................ 348/61; 348/148
[58] Field of Search ............................... 348/44, 61, 143, 348/794, 115, 148; 33/356; 362/83.1, 144, 2, 30; 606/11; 340/475, 148; 396/2; 345/7, 9; 296/37.7; 29/863; 356/141.1

[56] References Cited

U.S. PATENT DOCUMENTS

| | | | |
|---|---|---|---|
| 2,492,224 | 12/1949 | Kaplan et al. . | |
| 2,515,437 | 7/1950 | Bisch et al. . | |
| 3,591,792 | 7/1971 | Soltan | 362/144 |
| 4,443,819 | 4/1984 | Funada et al. | 348/794 |
| 4,477,184 | 10/1984 | Endo | 356/141.1 |
| 4,499,451 | 2/1985 | Suzuki et al. | 362/83.1 |
| 4,503,854 | 3/1985 | Jako | 606/11 |
| 4,546,551 | 10/1985 | Franks | 33/356 |
| 4,558,899 | 12/1985 | Cju | 296/97.8 |
| 4,591,987 | 5/1986 | Brown | 348/140 |
| 4,630,904 | 12/1986 | Pastore . | |
| 4,672,435 | 6/1987 | Gluck | 348/44 |
| 4,738,481 | 4/1988 | Watjer et al. | 296/37.8 |
| 4,824,159 | 4/1989 | Fluharty et al. | 296/37.7 |
| 4,893,867 | 1/1990 | Hilborn et al. | 296/214 |
| 4,910,591 | 3/1990 | Petrossian et al. | 348/148 |
| 4,988,140 | 1/1991 | Van Order . | |
| 5,014,167 | 5/1991 | Roberts | 362/83.1 |
| 5,037,182 | 8/1991 | Groves et al. . | |
| 5,039,153 | 8/1991 | Lindberg et al. | 296/37.7 |
| 5,072,246 | 12/1991 | Thayer et al. | 396/2 |
| 5,121,200 | 6/1992 | Choi | 348/148 |
| 5,148,283 | 9/1992 | Taddeo . | |
| 5,164,827 | 11/1992 | Paff | 348/143 |
| 5,182,675 | 1/1993 | Arbisi et al. . | |
| 5,207,492 | 5/1993 | Roberts | 362/30 |
| 5,289,321 | 2/1994 | Secor | 359/896 |
| 5,303,205 | 4/1994 | Gauthier | 367/108 |
| 5,309,634 | 5/1994 | Van Order | 29/863 |
| 5,355,284 | 10/1994 | Roberts . | |
| 5,361,190 | 11/1994 | Roberts et al. . | |
| 5,548,492 | 8/1996 | Hansen | 362/83.1 |
| 5,575,552 | 11/1996 | Faloon et al. | 362/83.1 |
| 5,741,966 | 4/1998 | Handfield | 73/146.5 |

*Primary Examiner*—Bryan Tung
*Attorney, Agent, or Firm*—Price, Heneveld, Cooper, DeWitt & Litton

[57] ABSTRACT

A vanity console is provided with a housing having a mirror mounted therein made of a material providing both reflectivity and transmissivity characteristics. A source of illumination such as a peripheral fluorescent tube extends behind the outer periphery of the mirror and directs light through the two-way mirror for use of the vanity mirror in low ambient light conditions. The mirror preferably is shaped to conform to the shape of a user's face. In one embodiment of the invention, positioned centrally behind the mirror is a video image source, such as an LCD display, which is supplied with video information from a variety of sources such as vehicle mounted cameras that the vanity console can serve the function of video imaging as well.

12 Claims, 7 Drawing Sheets

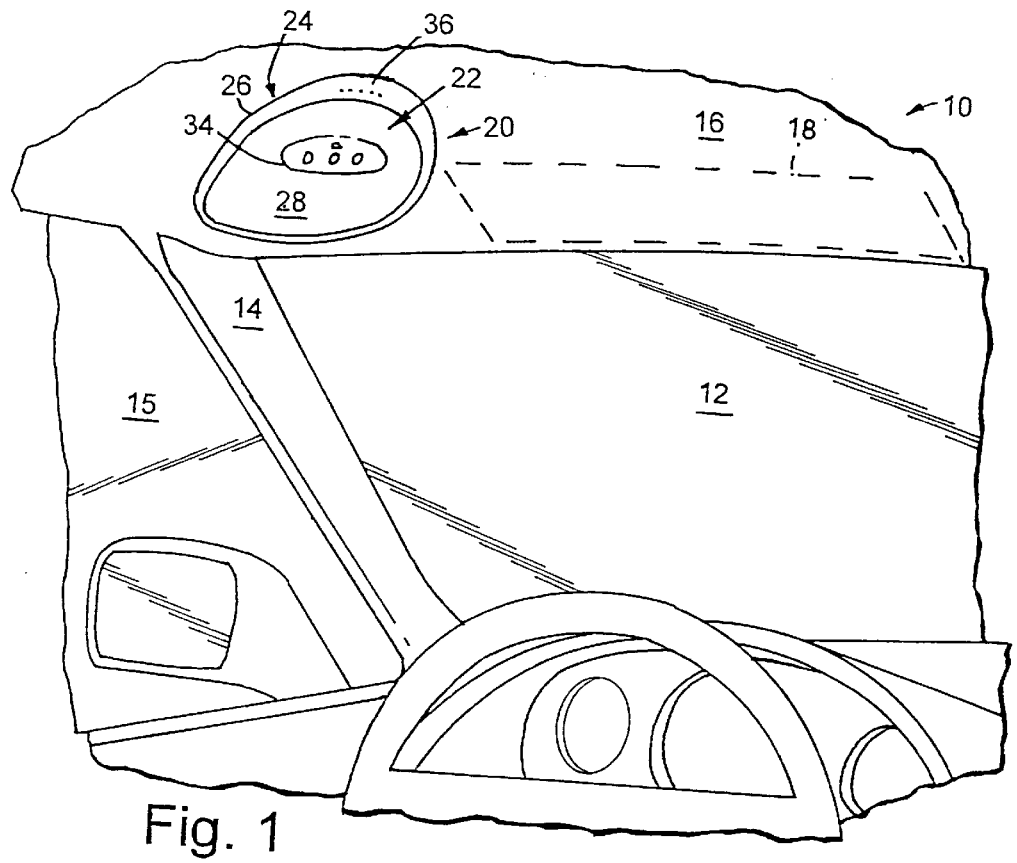
Fig. 1
Fig. 2
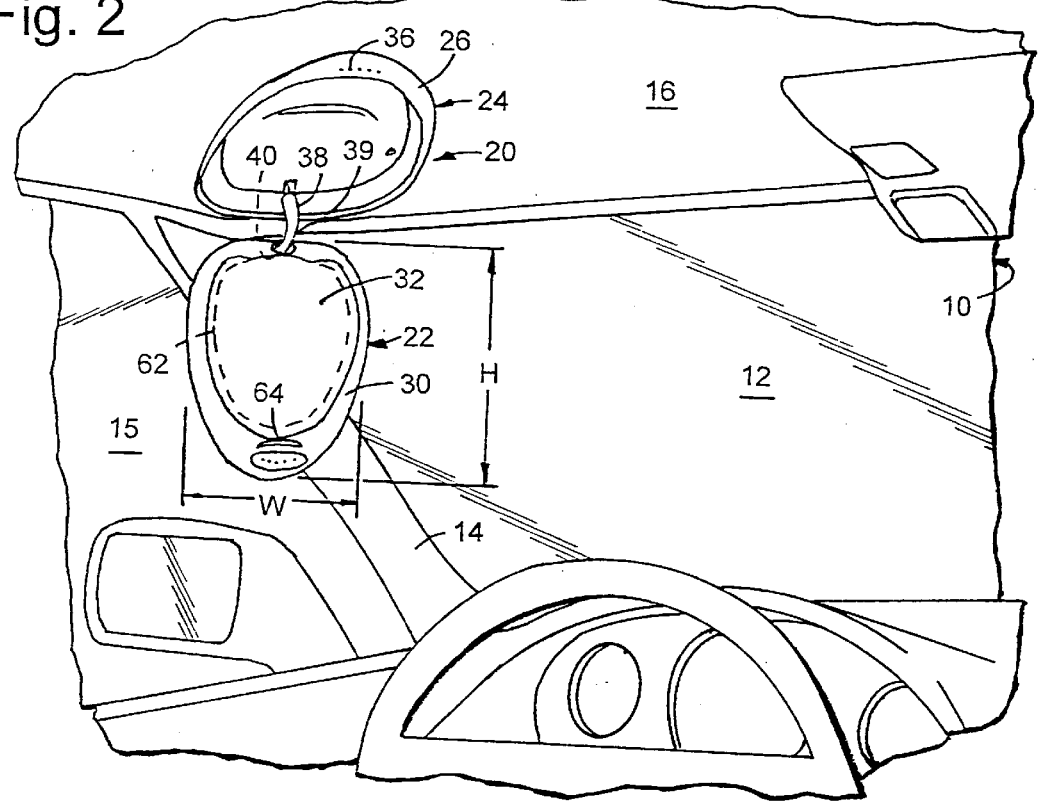

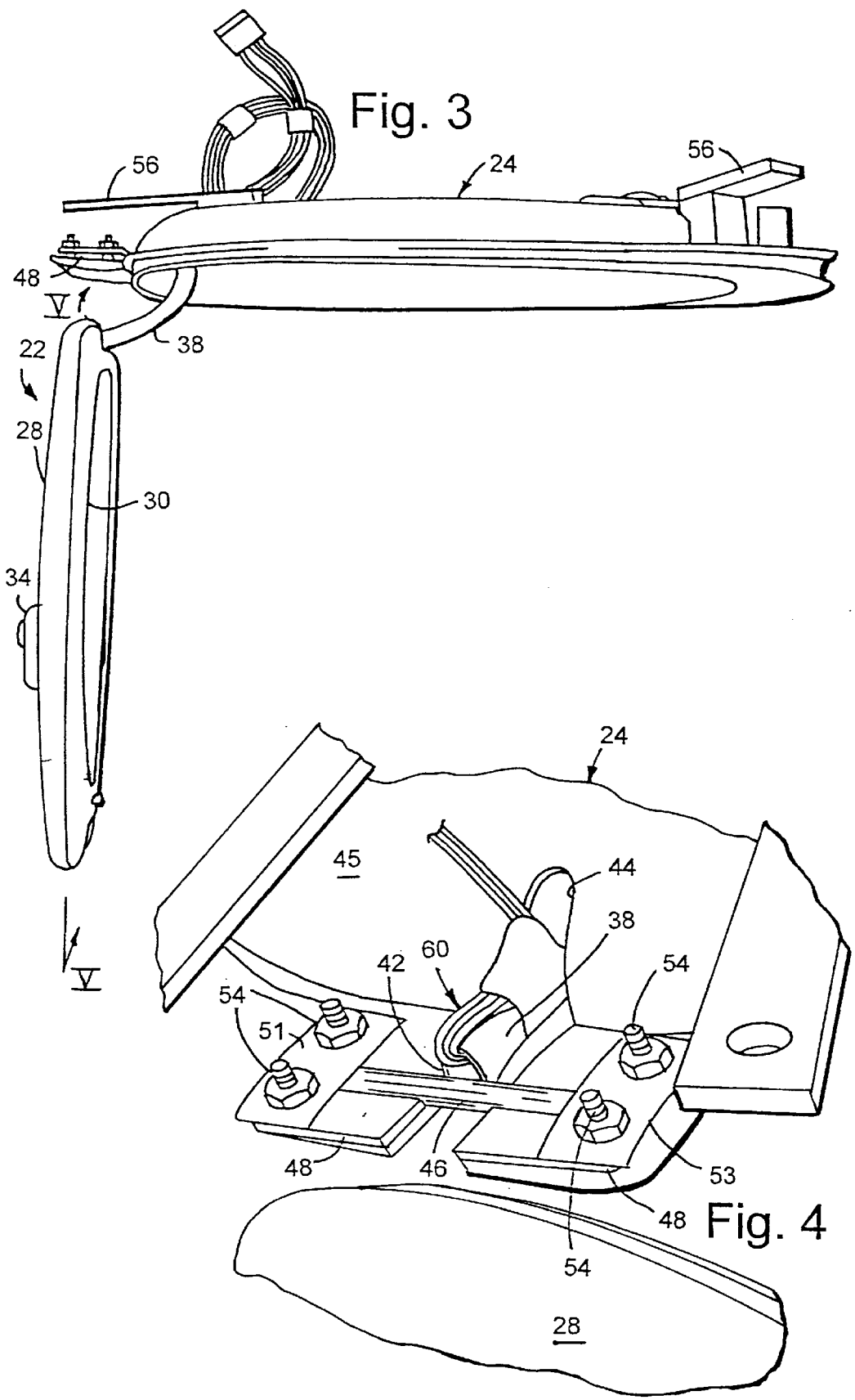

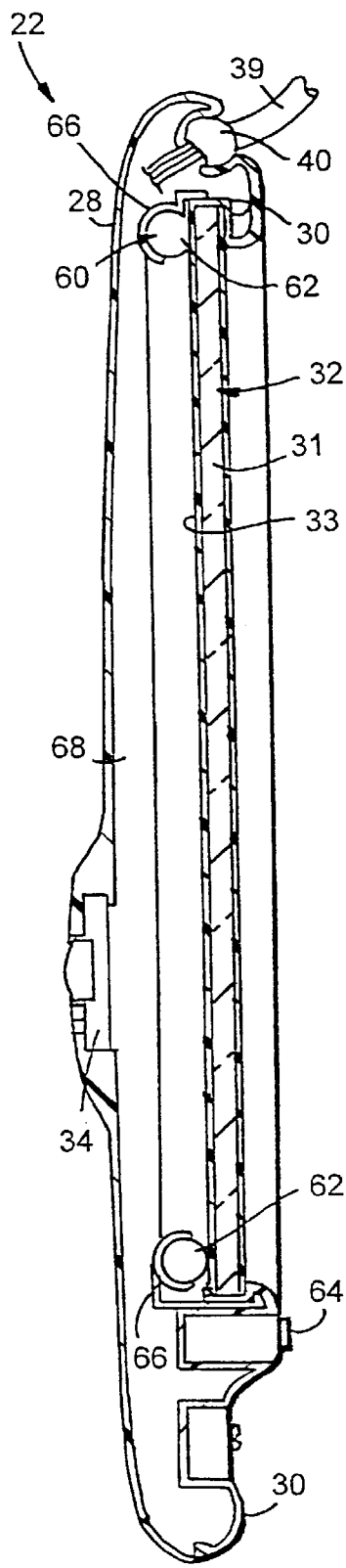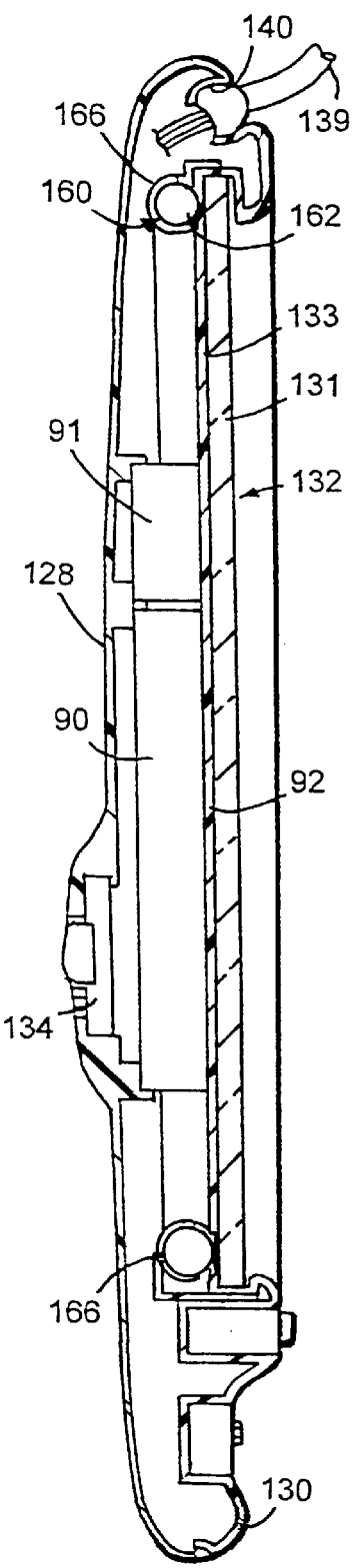
Fig. 5
Fig. 8

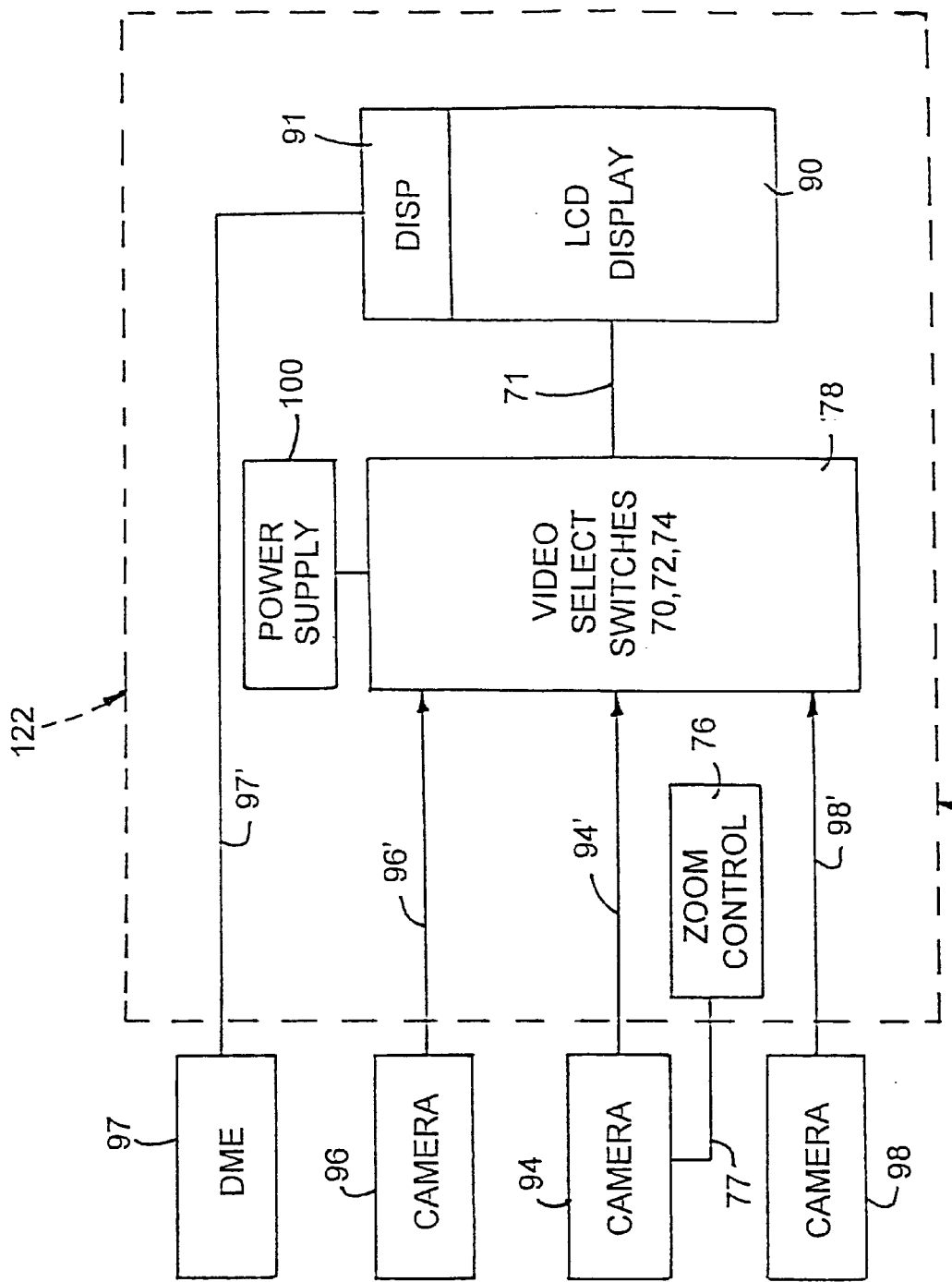

5,940,120

VANITY CONSOLE

BACKGROUND OF THE INVENTION

The present invention relates to a vanity console for use in a vehicle and one which provides an illuminated vanity mirror and/or video imaging.

Illuminated vanity mirror visors have been popular for many years and are a commonplace vehicle accessory. Although the vanity mirror incorporated in a visor is a convenient and cost efficient utilization of the visor for multiple functions, it does not always provide optimized functionality for a vanity mirror which is due, in part, to the shape constraints on a mirror mounted to a visor. U.S. Pat. Nos. 4,824,159 and 5,182,675 disclose vehicle mounted vanity mirrors which are shaped to conform more closely to the face of a user and which are mounted independently from a visor. Such mirrors function only as vanity mirrors and, when illuminated, the mirror area available, due to the placing of lights on either side of the mirror, is somewhat limited.

There remains a need to provide separate functions for visors and for illuminated 15 vanity mirrors which optimize the functionality of the viewing structure. It is desirable, therefore, to provide a mirror which is proportionate to the shape of one's face and provide improved lighting. Further, it is desirable to provide a vanity console which can be located in an area which does not interfere with the operation of separate visors nor block the operator's or driver's view of the roadway.

SUMMARY OF THE PRESENT INVENTION

By providing a vanity console which can be optimally located in the vehicle headliner at one or more locations, each individual can be provided with an illuminated vanity mirror which is positioned conveniently for utilization as a vanity mirror without interfering with the operation of other vehicle accessories, such as overhead consoles, visors, or the like. In the preferred embodiment of the invention, a vanity console is provided with a housing having a mirror mounted therein made of a material providing both reflectivity and transmissivity characteristics. The vanity console is coupled to a storage housing by a mechanical linkage allowing the console housing to be moved from a recessed, stored position within, in the preferred embodiment, the headliner of a vehicle to various lowered, adjustable use positions.

In the preferred embodiment of the invention, the illumination means comprise a peripheral fluorescent tube extending around and behind the outer periphery of the mirror for directing light through the optical coating for use of the vanity mirror in low ambient light conditions. The mirror preferably is shaped to conform to the shape of a user's face. When the mirror is used without illumination, the entire surface area of the mirror is available for use and, when the illumination is activated, only a relatively small peripheral boarder directs illumination toward the user's face thereby optimizing the surface area of the mirror usable under both low and high ambient light conditions.

In another embodiment of the invention, positioned centrally behind the mirror is a video image source, such as an LCD display, which is supplied with video information from a variety of sources such as vehicle mounted cameras such that the vanity console can serve the additional function of video imaging. In some embodiments of the invention, the video imaging is enhanced vision providing, for example, magnification of a portion of the user's face. Alternatively, the system may include cameras directed forwardly and/or rearwardly of the vehicle for providing rear visibility for parking, internal rear visibility for conversation with rear seat passengers or forward visibility utilizing an enhanced light amplification camera for providing video images under low ambient light conditions.

Thus, the vanity console of the present invention provides both an improved vanity mirror for utilization by a vehicle operator or passenger and/or video imaging for various functions when connected to a source of video signals. These and other features, objects and advantages of the present invention will become apparent upon reading the following description thereof together with reference to the accompanying drawings.

BRIEF DESCRIPTION OF THE DRAWINGS

FIG. 1 is a fragmentary, perspective view of a vehicle including a vanity console embodying the present invention with the console shown in a stored position;

FIG. 2 is a fragmentary, perspective view of the console of FIG. 1 shown in a lowered use position with behind-the-mirror peripheral illumination;

FIG. 3 is an enlarged left side, elevational view of the vanity console shown in FIG. 2;

FIG. 4 is an enlarged, fragmentary, top rear perspective view, partly broken away, of the mechanical coupling of the vanity console housing to the storage housing shown also in FIGS. 1–3;

FIG. 5 is a cross-sectional view of the vanity console taken along section lines V—V of FIG. 3;

FIG. 8 is a vertical, cross-sectional view through the vanity console shown in FIGS. 6 and 7, showing the mounting of the video displays behind the partially reflective mirror of the vanity console;

FIG. 10 is an electrical circuit diagram in block form showing the electrical circuit employed for coupling the circuit elements employed in the video imaging system of the vanity console of the present invention.

DETAILED DESCRIPTION OF THE PREFERRED EMBODIMENT

Figure 6:
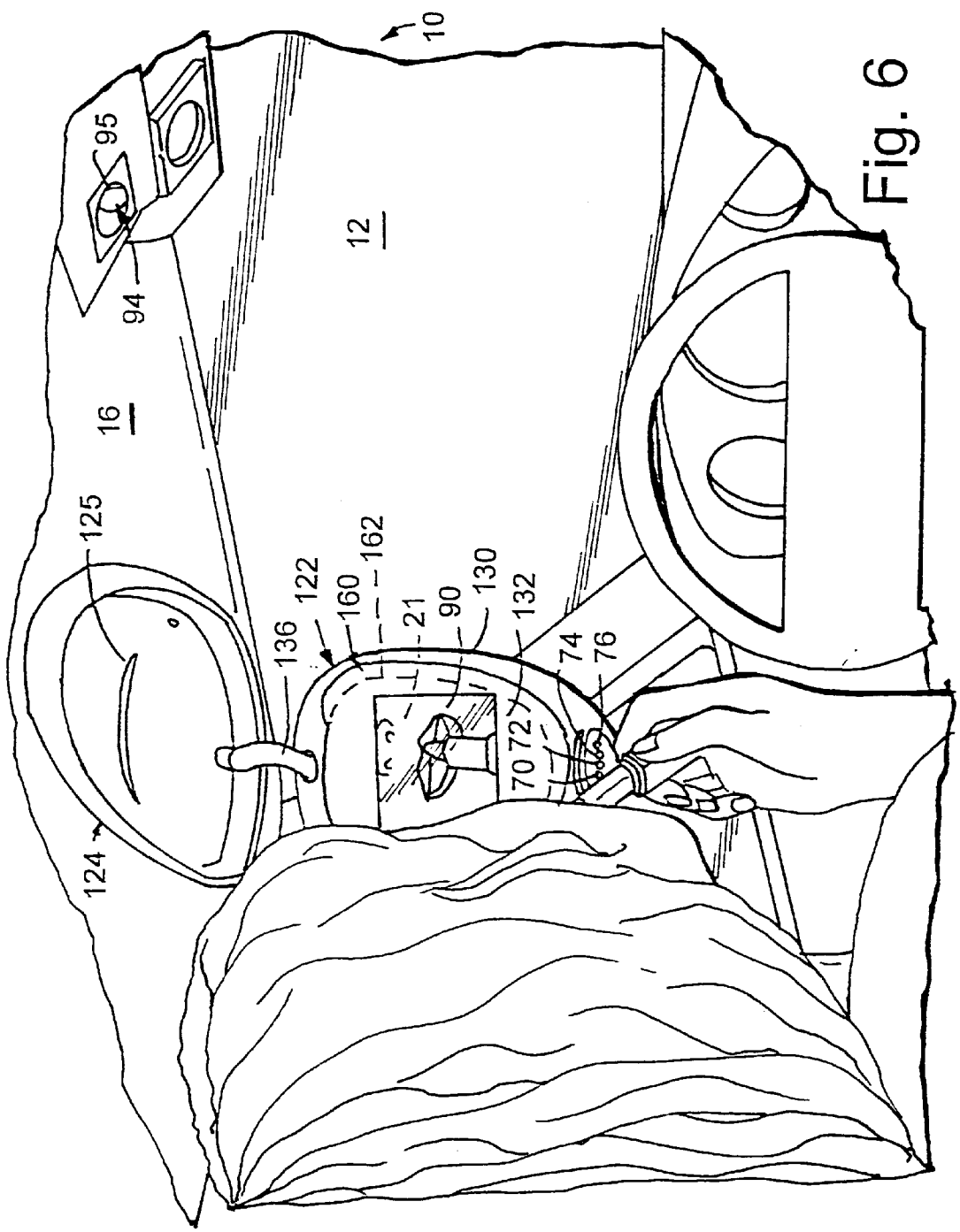
FIG. 6 is a fragmentary, perspective view of a vehicle showing an alternative embodiment of the invention.

Referring initially to FIGS. 1 and 2, there is shown a vanity console 20 embodying the present invention mounted in a vehicle 10, such as an automobile, and in particular to the roof area above windshield 12 near the junction of the A-pillar 14 with the windshield and roof. The vanity console 20 is, in the preferred embodiment, recessed within the headliner 16 and is positioned in the embodiment shown in FIG. 1 in the upper left front corner of the driver's side of the vehicle. The vehicle may include a slide out visor assembly 18 of the type disclosed in U.S. Pat. No. 5,328, 277, although a conventional visor assembly can be employed with its pivot rod bracket positioned below console 20.

Console 20 comprises a vanity mirror housing 22 movably coupled to a recessed storage housing 24 which may include a decorative bezel 26. Housing 22 comprises an outer panel 28 forming the outer decorative covering for the housing 22 and an inner frame 30 (FIGS. 2 and 3) for a vanity mirror 32 mounted, as best seen in FIG. 5, between panel 28 and frame 30. Recessed within the surface of panel 28 may be a trainable garage door opening transmitter 34 (FIGS. 1 and 5) of the type disclosed in U.S. Pat. No. 5,442,340. The vanity console 20 provides a convenient location for operation of such a garage door opening transmitter which can also be employed for the activation of interior home lighting utilizing one of the three available channels. A latch assembly with an actuator pad 36 on the bezel 26 holds the movable console housing 22 within storage housing 24. When actuator pad 36 is depressed by the operator, the latch, which can be of conventional design, allows the vanity console which is coupled to storage housing 24 by a mechanical linkage, shown in FIGS. 3 and 4 and described below, to drop down sufficiently to allow the user to move the console downwardly into a selected use position as shown, for example, in FIG. 2 in which the mirror 32 is exposed for use.

As best seen in FIG. 2, vanity housing 22 is somewhat oval and generally tear-dropped or face shaped such that mirror 32 can approximate the proportions of the face of a user. Thus, the height "H" of the housing 22, as seen in FIG. 2, is sufficiently greater than its width "W." In one embodiment, the height "H" of housing 22 was approximately 7 inches while the width "W" was approximately 5.75 inches. Although the vanity console 20 as shown in FIGS. 1 and 2 is mounted to the upper left front corner of the vehicle, a similar console can be mounted in other locations, such as the right front corner for the passenger, the center of the vehicle if it does not include an overhead console with, for example, a compass, or in individual rear seating areas by mounting such consoles to the vehicle roof in appropriate alignment with rear seats of the vehicle. Thus, a vehicle may contain a plurality of such vanity consoles for providing personalized viewing for each occupant. The details of construction of the illuminated vanity console 20 are now presented in conjunction with FIGS. 1–5.

The console housing 22 is pivotally mounted to the storage housing 24 by means of a mechanical linkage comprising, in the preferred embodiment as seen in FIGS. 2–5, a curved arm 38 having a lower end 39 coupled to housing 22 by a ball joint assembly 40 (FIG. 5) of conventional construction to allow the housing 22 to be adjustably pivoted about end 39 of arm 38. The opposite end 42 (FIG. 4) of arm 38 extends through a slot 44 in the rear wall 45 of storage housing 24, as best seen in FIG. 4, and is coupled to a transversely extending pivot rod 46 which is mounted to a split flange 48 extending from the periphery of housing 24. In the preferred embodiment, flange 48 is bifurcated and includes semicylindrical sockets 50, 52 for receiving the pivot rod 46 which is captively held to the bifurcated flange 48 by means of keeper plates 51, 53 secured to flange 48 by suitable fasteners such as nut and bolt combinations 54. The hollow pivot arm 38 allows a plurality of electrical conductors 60 to extend from within the console housing 22 to the vehicle's electrical system for providing operating power and video signals for the video imaging system of the present invention.

Housing 24 is mounted to the sheet metal roof of a vehicle using suitable mounting brackets 56 which extend outwardly from the periphery of the housing 24, as illustrated in FIG. 3, at various locations to secure the housing either directly to the sheet metal roof of the vehicle or to a reinforced area of the headliner 16 if console 20 is pre-mounted to the headliner as a preformed assembly.

The mirror 32 of the preferred embodiment is, as best seen in FIG. 5, a two-way type mirror which includes an outer glass surface 31 to which there is applied a partially reflective and partially transmissive coating 33 to provide partial reflectivity and partial transmissivity for mirror 32. In the preferred embodiment of the invention, coating 33, which is a standard commercially available film which can be vacuum deposited onto the rear surface of glass panel 31, had a reflectivity of from 50 to 90 percent and a transmissivity of from 50 to 10 percent, respectively. The reflectivity, in the preferred embodiment, was about 60 percent, while the light transmissivity was about 40 percent. The purpose of employing the two-way mirror 32 for the vanity console is to allow illumination means 60 positioned behind the mirror 32 and/or a video monitor, as described in another embodiment below, to be viewable and visible from the front side of the mirror only when actuated. The mirror 32 appears as a standard mirror when such illumination means 60 are not activated.

In a preferred embodiment of the invention as seen in FIGS. 2 and 5, illumination means 60 comprises a peripheral fluorescent tube 62 with a generally circular cross section extending around the periphery of mirror 32 to provide even illumination for the face of the user. When actuated by light switch 64 (FIG. 2), the fluorescent tube 62 provides light through the transmissive film 33 to the face of the user for illuminating the face of the user with the central area of the mirror still appearing as a mirror to the user. Fluorescent tube 62 can be any glass tube filled with a suitable fluorescent gas mixture such as mercury-argon to provide the desired light frequency for utilization as a vanity mirror light. Tube 62 is mounted to the frame 30 utilizing suitable mounting brackets such as brackets 66 (FIG. 5) spaced at suitable locations and secured to the inner surface of the periphery of frame 30 to provide the secure mounting of the light tube 62. In FIG. 2 tube 62 is shown in phantom to illustrate that it is substantially invisible behind mirror 32 except when illuminated.

The power supply for actuating the fluorescent tube 62 can also be suitably mounted within the central open area 68 of console housing 22 and is coupled to the vehicle's 12-volt electrical system through the actuating switch 64 which is coupled to the vehicle's operating system through a suitable power conductor included in the bundle of electrical conductors 60. The mirror 32 is commercially available from a variety of commercial suppliers, such as Libbey Owens Ford, and can be manufactured with the desired light transmissive/ reflective characteristics for a given installation. Similarly, illumination means 60, although in the preferred embodiment comprises a fluorescent tube, may take on other forms of illumination such as conventional lamps. It has been discovered, however, that the peripheral boundary lighting provided by the continuous fluorescent tube 62 is preferable.

In addition to providing the illuminated vanity mirror with concealed illumination to allow the full surface of the mirror to be used under normal ambient lighting and an illuminated mirror to be used under low ambient lighting, the console 20 of the present invention can also provide video imaging as illustrated in the embodiments shown in FIGS. 7–10. In such embodiments, a video monitor is incorporated in the space 68 (FIG. 5) of the illuminated vanity console 22 which provides the same illuminated or non-illuminated vanity mirror functions as before with the addition of the capability of video imaging behind the light transmissive mirror 32 when desired. The video imaging is now described in connection first with the display functions provided in FIGS. 6 and 7 and subsequently the description accompanying FIGS. 8–10.

Referring to FIG. 6, there is shown a vanity console 120 which is of the same construction as vanity console 20 with similarly identified components including the numerical prefix "1." Console 120 additionally includes of video monitor 90, video source selector switches 70, 72, 74 and zoom control switch 76, which switches are mounted to the lower end of housing 130. As seen in FIGS. 6 and 8, positioned centrally behind the mirror 132 is a flat screen video monitor 90 having a video image projecting surface 92 immediately adjacent film 133 such that images projected by monitor 90 can be seen through mirror 132 as seen in FIG. 6. A first television camera 94 has a zoom lens 95 controlled by zoom control switch 76 and is pointed toward the user's face. Camera 94 is activated by switch 70 which also couples its composite video output signals to the input of monitor 90. Camera 94 thus can provide an enhanced close-up and magnified image, shown as the lip area 21 of the user 23 in FIG. 6, such that such a magnified image can be viewed through the vanity console 120. With such system, it may be desirable to actuate the illumination means 160 to provide sufficient light for camera 94 to provide a clear magnified image of a portion of the user's face. Camera 94 can be a conventional color CCD type camera with a controllable zoom lens 95 to also provide a wide angle field of view such that the user can view rear seat passengers either for conversational purposes or for tending to infants or young children. Thus, camera 94 typically will be mounted in an area proximate the user 23 but also facing generally rearwardly such that it can provide a clear line of vision to both the face of the user as well as the rear seat area of the vehicle. Video monitor 90 can be a conventional flat screen color LCD type monitor, preferably having a diagonal screen of approximately 3 to 4 inches and which receives composite N.T.S.C. video signals from one of a plurality of cameras such as camera 94.

Figure 7:
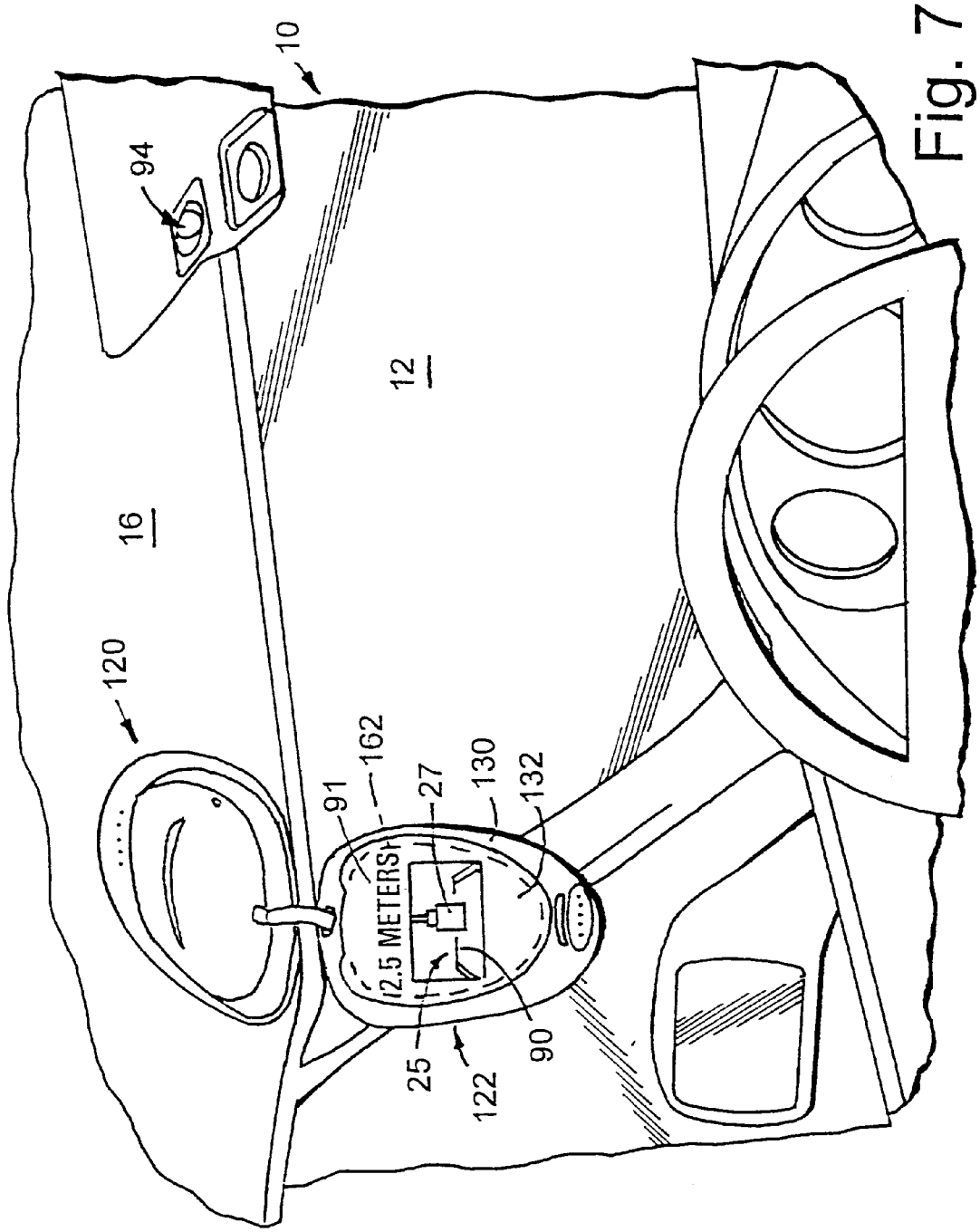
FIG. 7 is a fragmentary, perspective view of a vehicle including yet another embodiment of the invention.
Figure 9:
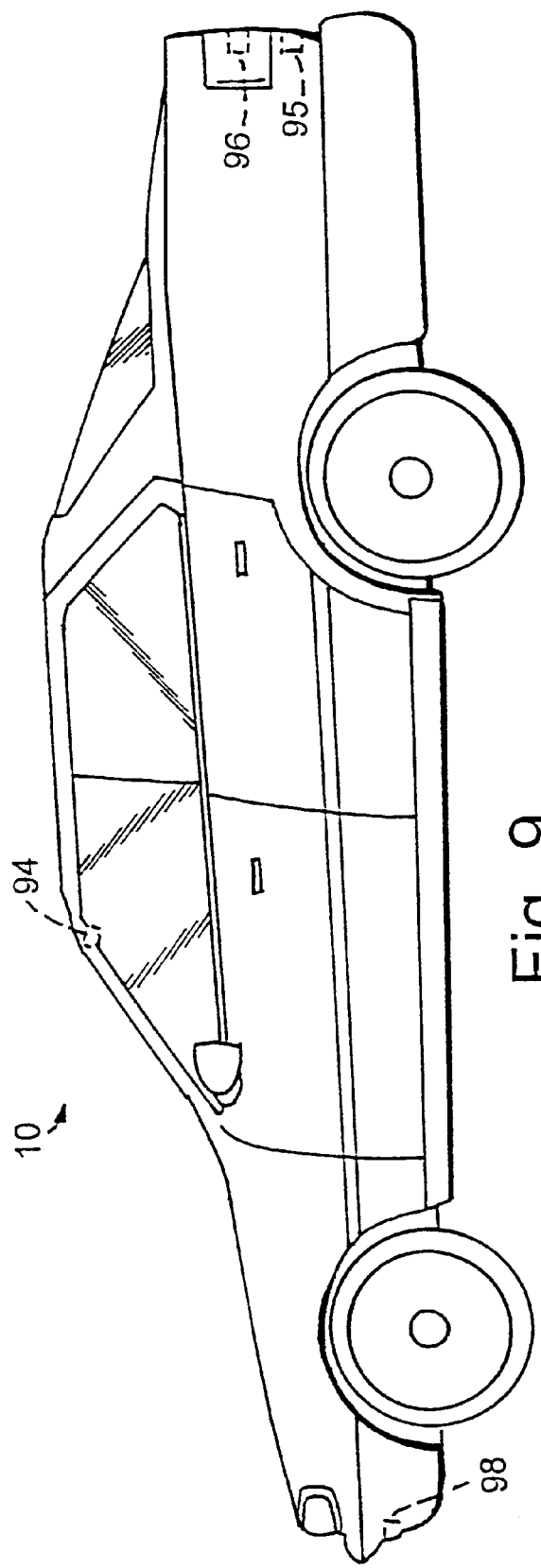
FIG. 9 is a pictorial view of a vehicle showing the position of mounting of various cameras in a video imaging system such as that shown in FIGS. 6–8.

In the embodiment shown in FIG. 7, the vanity console 120 includes not only a video monitor 90 but, in addition, a distance display 91 which operates in conjunction with an ultrasonic or infrared distance measuring sensor 97 associated with a rear vision camera 96 (FIG. 9). Camera 96 is mounted in the rear area of the vehicle, preferably in the rear bumper area behind a suitable sealed window for providing protection for the camera from the environment. A video and power supply conductor 96' extends from camera 96 as described in connection with FIG. 10 to provide composite color video signals to the monitor 90 mounted within the body of console housing 122. Camera 96 can provide a wide angle rear view of traffic or objects behind the vehicle.

As seen in FIG. 7, a video image 25 from camera 96 is displayed by monitor 90 showing the proximity of, for example, a lamp post 27 as being 2.5 meters from the rear bumper area as indicated on display 91 positioned above the monitor display surface 92. The distance measuring (D.M.E.) system 97 is a commercially available unit which provides digital signals from a sensor unit representing the distance of an object from the sensor. Such signals are coupled to an LED display 91 for display. Such D.M.E. units are generally commercially available.

In addition to cameras 94 and 96 as shown in FIGS. 6 and 7, as seen in FIG. 9, a vehicle 10, such as an automobile may also include a forward facing camera 98 which can be employed for selectively providing a wide angle view of the roadway. Camera 98 may be coupled, if desired, to a video tape recorder as well as to monitor 90 for providing a record of areas traveled by, for example, a family on vacation. Thus, in addition to providing front visibility, camera 98 can be used as a video signal source for recording scenery. If desired for use under low ambient light conditions, camera 98 can be of the type including image enhancing sensors such as are commercially available from IT&T to provide low light enhanced visibility under poor lighting conditions to provide a visual aid to the vehicle operator under such conditions. It is to be understood, however, that such enhanced light imaging is used as a further assistance to the vehicle operator and not as the primary field of vision for the vehicle operator. Each of the cameras 94, 96 and 98 can be adjustably mounted to the vehicle to allow the vehicle operator to adjust the pointing direction for particular applications. Such adjustable camera mounts are conventional.

Turning now to FIG. 10, there is shown a block electrical circuit diagram of the system in which each of the cameras 94, 96, 98 are coupled by a video select control circuit 78 including switches 70, 72, 74 for providing a video output signal by a conductor 71 to the video input of monitor 90. Input from camera 96 is applied to video select console 78 through video conductor 96'. Similarly, cameras 94, 98 are coupled via conductors 94', 98' to the input of video selector circuit 78 such that any one of the camera's composite video output signals can be selected for display on monitor 90. Similarly, display 91 is coupled to the distance measuring sensor 97 by means of conductors 97' to provide signals applied to display 91. Zoom control switch 76 is a conventional spring loaded two-position switch coupled to camera 94 by means of a pair of conductors 77 to provide zoom in and zoom out control signals for the camera lens 95. In some installations, it may be desirable to also provide cameras 96 and 98 with zoom lenses, in which case the video select switch console 78 may also include conventional circuits for coupling zoom control 76 to the particular camera selected. Suitable operating power from a vehicle's power source 100 is selectively applied to the cameras by the actuation of the selector switches 70, 72, 74. Such power can be applied through conductors 94', 96', 98' if desired to minimize the required wiring. In the embodiment shown in FIGS. 1–5 and 6–10, when the video monitor 90 is not activated by the actuation of one of the switches 70, 72, 74 a first time (a second depression deactivating the camera and also power to display 90), the mirror 132 can be utilized with or without the back lighted illumination means 160 to provide a vanity mirror for normal use. As with the vanity console 20, consoles 120 can be positioned at various locations within the vehicle and may include additional switch circuits so that each monitor can be coupled to a selected camera or other video source.

These and other modifications to the preferred embodiments of the invention described herein can be made by those skilled in the art without departing from the spirit or scope of the invention as defined by the appended claims.

The embodiments of the invention in which an exclusive property or privilege is claimed are defined as follows:

1. A vanity mirror console for a vehicle comprising:
   a housing;
   a partially reflective two-way mirror mounted to said housing;
   a video camera mounted to the vehicle for providing a video image; and
   a video display mounted in said housing behind said two-way mirror for providing a video image through said mirror to be visible to a user facing said mirror, wherein said camera has a lens positioned to face the user of said vanity mirror console and an electrical circuit coupling video signals from said camera to said video display for providing a video image of the user's face.

2. The vanity console as defined in claim 1 wherein said lens is a zoom lens and said housing includes a control for operating said zoom lens.

3. The console as defined in claim 1 and further including a source of illumination positioned in said housing behind said mirror and visible when actuated for projecting light outwardly through a first portion of said mirror to provide illumination to the face of a user.

4. The console as defined in claim 3 wherein said partially reflective mirror has a reflectivity from about 50% to 90% and a corresponding light transmissivity from about 50% to 10%.

5. The console as defined in claim 4 wherein said reflectivity is preferably about 60% and said transmissivity is about 40%.

6. A vanity mirror console for a vehicle comprising:

a housing mounted in the vehicle;

a partially reflective vanity mirror mounted to said housing;

a video display mounted in said housing behind said mirror for providing a video image through said mirror to be visible to a user; and a plurality of video cameras for mounting to a vehicle, wherein a first of said cameras has a lens facing the user of said video console and a circuit selectively coupling video signals from said first camera to said video display for providing a video display of the user's face on said video display.

7. The vanity console as defined in claim 6 wherein said lens is a zoom lens and said housing includes a control for operating said zoom lens.

8. The console as defined in claim 6 wherein a second camera is mounted to the vehicle with a lens facing rearwardly to view objects outside and behind the vehicle, and further including a circuit for selectively coupling said first or said second camera to said video display.

9. The console as defined in claim 8 and further including a third camera for mounting to a vehicle in a forward facing direction for viewing the area in front of the vehicle and wherein said circuit selectively couples at least one of said first, second or third cameras to said video display.

10. The console as defined in claim 6 wherein said partially reflective mirror has a reflectivity from about 50% to 90% and a corresponding light transmissivity from about 50% to 10%.

11. The console as defined in claim 10 wherein said reflectivity is preferably about 60% and said transmissivity is about 40%.

12. A vanity mirror console for a vehicle comprising:

a housing;

a partially reflective mirror mounted to said housing;

a source of illumination mounted in said housing behind said mirror and only visible when actuated for directing illumination outwardly from said source through a portion of said partially reflective mirror to provide illumination to the face of a user;

an electrical circuit including a switch for selectively actuating said source of illumination;

a video display mounted in said housing behind said mirror for providing a video image visible through said mirror when actuated; and at least one video camera for mounting to a vehicle and a circuit selectively coupling video signals from said at least one camera to said video display for providing video signals for display, wherein said at least one video camera has a lens facing a user of said video console for providing a video display of the user's face.

* * * * *